US010064262B2

(12) United States Patent
Voronin et al.

(10) Patent No.: US 10,064,262 B2
(45) Date of Patent: Aug. 28, 2018

(54) APPARATUS FOR TREATING A GAS STREAM

(75) Inventors: Sergey Alexandrovich Voronin, Rensselaer, NY (US); Mark James Attwood, Banwell (GB)

(73) Assignee: Edwards Limited, Burgess Hill, West Sussex (GB)

( * ) Notice: Subject to any disclaimer, the term of this patent is extended or adjusted under 35 U.S.C. 154(b) by 1165 days.

(21) Appl. No.: 14/238,840

(22) PCT Filed: Jul. 11, 2012

(86) PCT No.: PCT/GB2012/051631
§ 371 (c)(1),
(2), (4) Date: Feb. 13, 2014

(87) PCT Pub. No.: WO2013/024248
PCT Pub. Date: Feb. 21, 2013

(65) Prior Publication Data
US 2014/0209575 A1  Jul. 31, 2014

(30) Foreign Application Priority Data

Aug. 17, 2011 (GB) .................................. 1114173.6

(51) Int. Cl.
*B23K 9/00* (2006.01)
*H05H 1/26* (2006.01)
*B01D 53/32* (2006.01)

(52) U.S. Cl.
CPC ............. *H05H 1/26* (2013.01); *B01D 53/323* (2013.01); *B01D 2257/20* (2013.01);
(Continued)

(58) Field of Classification Search
CPC ............ B01D 2257/20; B01D 2257/40; B01D 2257/55; B01D 2258/0216;
(Continued)

(56) References Cited

U.S. PATENT DOCUMENTS 5,506,384 A * 4/1996 Yamaguchi .......... B23K 10/006
219/121.54
2001/0034519 A1 * 10/2001 Goble .................. A61B 18/042
606/41
(Continued)

FOREIGN PATENT DOCUMENTS

EP   1977815 A1   10/2008
EP   2386347 A1   11/2011
(Continued)

OTHER PUBLICATIONS

First Office Action, and translation thereof, from counterpart Taiwan Patent Application No. 101125896, dated Dec. 2, 2015, 7 pp.
(Continued)

*Primary Examiner* — Sang Y Paik
(74) *Attorney, Agent, or Firm* — Westman, Champlin & Koehler, P.A.; Theodore M. Magee

(57) ABSTRACT

In order to increase the operable range of a DC plasma torch in an abatement apparatus, the apparatus comprises a power control configured for controlling the power of the plasma torch by selective control of the plasma source gas flow regulator.

13 Claims, 4 Drawing Sheets

(52) U.S. Cl.
CPC ...... *B01D 2257/40* (2013.01); *B01D 2257/55* (2013.01); *B01D 2258/0216* (2013.01); *B01D 2259/818* (2013.01)

(58) Field of Classification Search
CPC .. B01D 2259/818; B01D 53/323; H05H 1/26; H05H 1/32; H05H 1/34; H05H 1/42
USPC ............ 219/121.48–121.51, 121.54, 121, 55
See application file for complete search history.

(56) References Cited

U.S. PATENT DOCUMENTS

| | | | |
|---|---|---|---|
| 2003/0000823 A1 | 1/2003 | Uhm et al. | |
| 2007/0079892 A1* | 4/2007 | Cohen | F17C 5/007 141/105 |
| 2011/0023879 A1* | 2/2011 | Vandine | A61M 16/0051 128/204.21 |

FOREIGN PATENT DOCUMENTS

| | | |
|---|---|---|
| JP | H0240441 A | 2/1990 |
| JP | 2005524817 A | 8/2005 |
| JP | 2006224066 A | 8/2006 |
| JP | 2006297275 A | 11/2006 |
| JP | 2008194674 A | 8/2008 |
| JP | 2010142749 A | 7/2010 |
| WO | 2008068917 A1 | 6/2008 |

OTHER PUBLICATIONS

Translation of the Notification of Reason for Rejection from counterpart Japanese Application No. 2014-525483, dated Jun. 28, 2016, 4 pp.
English Translation of the First Office Action from counterpart Chinese Patent Application No. 201280040003.7, dated Dec. 26, 2014, 4 pp.
Notification of Transmittal of the International Search Report and the Written Opinion of the International Searching Authority, or the Declaration dated Oct. 8, 2012 in counterpart PCT Application No. PCT/GB2012/051631, 10 pgs.
Search Report under Section 17(5) dated Nov. 25, 2011 in counterpart GB Application No. 1114173.6, 4 pgs.
Response dated Jul. 5, 2017 for corresponding European Application No. 12740640.3-1356.
Response dated May 31, 2017 for corresponding British Application No. GB1114173.6.

\* cited by examiner

APPARATUS FOR TREATING A GAS STREAM

This application is a national stage entry under 35 U.S.C. § 371 of International Application No. PCT/GB2012/051631, filed Jul. 11, 2012, which claims the benefit of G.B. Application 1114173.6, filed Aug. 17, 2011. The entire contents of International Application No. PCT/GB2012/051631 and G.B. Application 1114173.6 are incorporated herein by reference.

TECHNICAL FIELD

The present disclosure relates to an apparatus and method for treating a gas stream. The techniques and apparatuses described herein find particular application in the treatment of a gas stream exhaust from a process chamber used in the semiconductor or flat panel display industry.

BACKGROUND

A primary step in the fabrication of semiconductor devices is the formation of a thin film on a semiconductor substrate by chemical reaction of vapor precursors. One known technique for depositing a thin film on a substrate is chemical vapor deposition (CVD), which is commonly plasma enhanced (PECVD). In this technique, process gases are supplied to a process chamber housing the substrate and react to form a thin film over the surface of the substrate. Examples of gases supplied to the process chamber to form a thin film include, but are not restricted to: silane and ammonia for the formation of a silicon nitride film; silane, ammonia and nitrous oxide for the formation of a SiON film; TEOS and one of oxygen and ozone for the formation of a silicon oxide film; and $Al(CH_3)_3$ and water vapor for the formation of an aluminum oxide film.

After processing, the gases exhausted from a processing chamber must be treated prior to release or storage. Gases exhausted from a process chamber can be treated with high efficiency and at a relatively low cost using a plasma abatement device. In the plasma abatement process, the exhaust gas stream is caused to flow into a thermal atmospheric pressure plasma discharge, which is primarily a source of heat. The plasma causes dissociation of the gas stream into reactive species which can combine with oxygen or hydrogen to produce relatively stable by-products.

The different gases used in the cycle of operation of a processing chamber require different amounts of electrical power to be supplied to the torch for effective treatment. Ordinarily, the voltage of the source of electrical energy remains generally constant and change in power is controlled by controlling the supplied current. A typical DC plasma torch has a restricted power range between a lower limit which is defined by the minimum current at which a discharge may be sustained by the torch without quenching and a higher limit which is defined by the maximum current rating of the power supply used or the maximum current which does not result in thermal damage to the torch electrodes.

However, the voltage-current characteristics of a DC plasma torch shows a decrease in voltage with a current increase and vice versa. Thus, even large changes in the torch current result in relatively smaller variations in the power. For example, changing the operating current from 20 A to 40 A (i.e. a 100% increase) increases the torch power by as little as about 60%.

SUMMARY

It is an object of the present disclosure to increase the operable power range of a DC plasma torch in a treatment apparatus.

The present disclosure describes an apparatus for treating a gas stream, comprising a DC plasma torch for generating a plasma flare from a source gas when energised by a source of electrical energy, a flow regulator for regulating the flow rate of the source gas supplied to the torch to be energised, and a DC plasma torch power control configured for controlling the power of the plasma torch by selective control of the flow regulator.

Other preferred and/or optional features of the disclosure are defined in the accompanying claims.

BRIEF DESCRIPTION OF DRAWINGS

In order that the disclosure may be well understood, some embodiments and methods of operating thereof, which are given by way of example only, will now be described with reference to the accompanying drawings.

DETAILED DESCRIPTION

Figure 1:
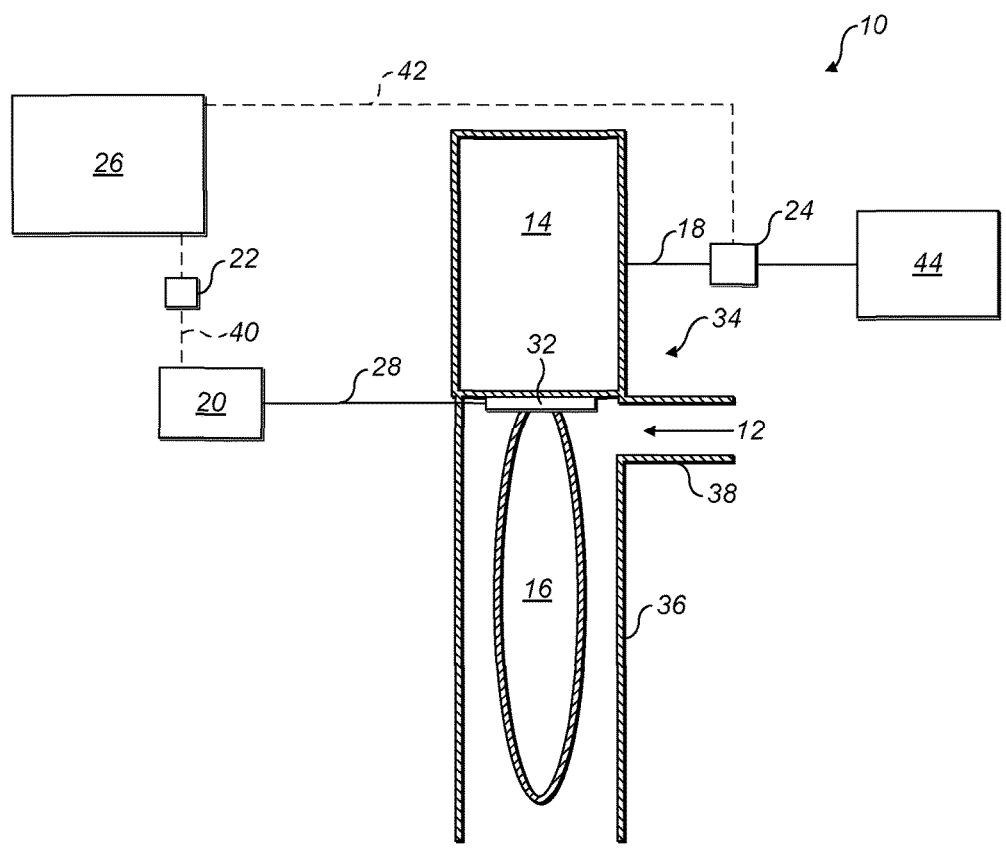
FIG. 1 shows schematically apparatus for treating a gas stream.

Referring to FIG. 1, apparatus 10 is shown for treating a gas stream 12. The apparatus comprising a DC plasma torch 14 for generating a plasma flare 16 from a source gas 18 when energised by a source of electrical energy 20. A current control 22 controls the amount of current supplied to the torch by the power source. A flow regulator 24 regulates the flow rate of the source gas 18 supplied to the torch to be energised. A power control 26 is configured for controlling the power of the plasma torch by selective control of the current control 22 and the flow regulator 24. As explained in more detail below, a change in current produces relatively small changes in power, whereas changes in flow produce relatively large changes in power. In one arrangement therefore, the current control may be omitted so that power is controlled by the flow regulator alone.

The source of electrical energy 20 is connected by electrical conductors 28 to the electrodes 32 of the plasma torch, shown highly schematically in FIG. 1. A more detailed description of the plasma torch is provided in relation to FIG. 4. When electrical energy is supplied to the electrodes, an electric field passes through a source gas 18 conveyed into the plasma torch thereby ionising the source gas generating the plasma flare 16. The plasma flare extends downstream into a plasma reactor chamber 36 in which a reaction with the exhaust gas stream 12 occurs. The gas stream to be treated 12 is conveyed into the reactor chamber through inlet 38. The current control 22 is responsive to current control signals output from the power control 26 along a control line 40 shown schematically in broken lines. In response to the power control 26, the current control 22 controls the current supplied to the electrodes by the source of electrical energy 20.

The flow regulator 24 is responsive to flow control signals output from the power control 26 along a control line 42 shown schematically in broken lines. In response to the power control, the flow regulator controls the flow rate of source gas conveyed from a supply 44 of source gas to the plasma device and which is energised to form the plasma flare. The source gas is typically nitrogen, but other gases may be used as required.

Figure 2:
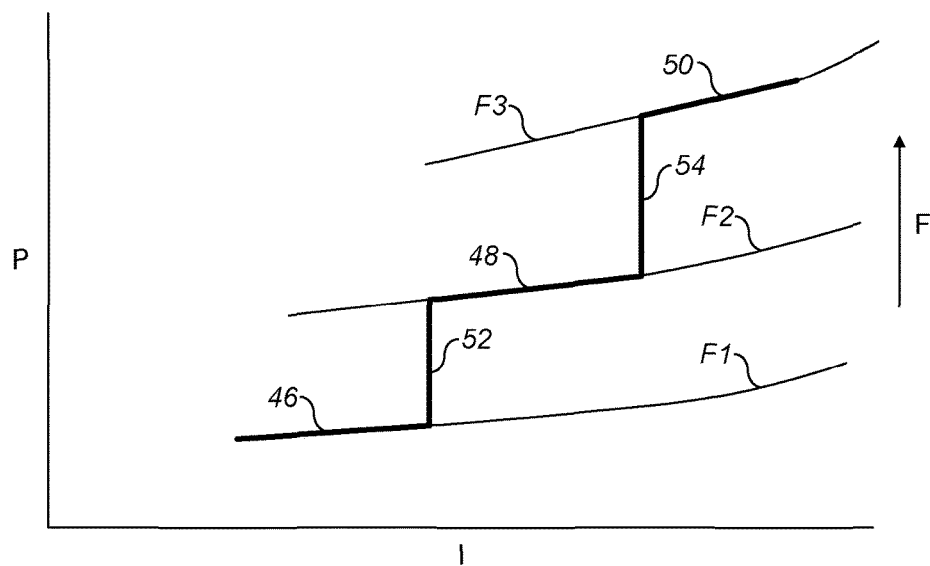
FIG. 2 shows graphically a relationship between power, current and flow rate.

The power control 26 is configured to vary the power supplied to the torch 14 by varying both the current and the flow rate in accordance with a predetermined relationship between power, current and flow rate. The relationship is shown in FIG. 2, in which power, P, is shown on the y-axis, current, I, is shown on the x-axis and increasing source gas flow rate is shown by arrow F. The graph shows three curves F1, F2, F3, representing three different source gas flow rates. The flow rate increases from F1 to F2 to F3. For example, F1 may be 10 slm, F2 may be 20 slm and F3 may be 30 slm. The curves F1, F2, F3, show the relationship of current against power for different flow rates. It will be seen that at a constant flow rate a relatively large change in current results in a relatively small change in power.

Accordingly, the power control 26 is configured to control the power of the torch in a plurality of different power regimes 46, 48, 50. The power is varied within a power regime by controlling the current supplied to the torch and switching between the regimes is controlled by regulating the flow of source gas. The operable power range of the torch is shown by the thick line in FIG. 2. A step change 52 in power occurs between regime 48 and 50 when the flow rate is increased from F1 to F2. A further step change 54 in power occurs when the flow rate is increased from F2 to F3.

Accordingly, slight adjustments of power can be effected by current control. On the other hand, the step change in power between regimes is relatively large compared to the limits of power control of said torch so that large changes in power can be effected by flow rate control. If the limits of power control are considered to be 100%, a current change may achieve a change in power of less about 10% for a given flow source gas flow rate; whilst a source gas flow rate change may achieve a change in power of 20% or more.

Although three power regimes are shown in FIG. 2, the control may instead be configured to operate the torch in two power regimes or in more than three power regimes depending on the requirements of the treatment apparatus.

In comparison with the prior art, the operable power range of the present treatment apparatus is extended from a known 30-70% to as much as 300-500% combining changes of the torch operating current with the feed gas (N2) flow rate.

The plasma torch is therefore controllable to treat a plurality of gas streams which require different amounts of power for treatment, and the plurality of power regimes utilised for this are arranged to correspond with respective different amounts of required power. The plasma torch may additionally or alternatively be controlled to operate in an idle mode for reducing the consumption of electrical energy, and at least one of the power regimes is arranged to correspond with the power required to operate the plasma torch in the idle mode. That is, the torch may have two power regimes, one for idle mode and one for gas treatment, or both for gas treatment without an idle mode. Alternatively, the torch may have more than two power regimes, one being for idle mode and the others being for treatment of different exhaust gas compositions.

By way of example, the precursors used in a CVD process cycle may have three power band requirements.

In an idle mode, 0.5 to 1 kW of power may be required. A first power regime, for example 46 in FIG. 2 is arranged for operating the torch in such an idle mode. A flow rate F1, which may be 10 slm, may be selected to achieve the required power range, whilst current control within the range allows smaller adjustment of power. This regime is used to sustain plasma discharge at a minimum consumption of the electrical energy to avoid quenching of the discharge.

In a deposition mode, 2 to 3 kW of power may be required. A second power regime, for example 48 in FIG. 2 is arranged for operating the torch to treat deposition gases such as pyrophoric or flammable precursors used for dielectric film deposition (e.g. Silane, Ammonia, TEOS, or 4MS). A flow rate F2, which may be 20 slm, may be selected to achieve the required power range, whilst current control within the range allows smaller adjustment of power.

In a cleaning mode, 2.5 to 5 kW of power may be required. A third power regime, for example 50 in FIG. 2 is arranged for operating the torch the cleaning mode to treat cleaning gases such as F2 or NF3. A flow rate F3, which may be 30 slm, may be selected to achieve the required power range, whilst current control within the range allows smaller adjustment of power.

In another exemplary arrangement, two different N2 flow rates may be used for high and low power operating regimes. A high power operating regime for F2 and NF3 abatement may be used during a cleaning step. This regime may require 15 slm N2 for an operating power of 3 to 5 kW. A low power operating regime may be used for a deposition step and idle mode. This latter regime may require 5 slm N2 for an operating power of 1.5 to 2.5 kW. The power control may be configured to switch between these two regimes at a moderate current of 25 A.

The flow regulator 24 may be a mass flow controller which is operable by the power control 26 for selecting any one flow rate between zero, or no flow, and 100%, or maximum flow. A mass flow controller gives good design flexibility and control for operating the torch at any flow rate required between maximum and minimum flow rates. However, a mass flow controller is expensive and requires regular maintenance.

Figure 3:
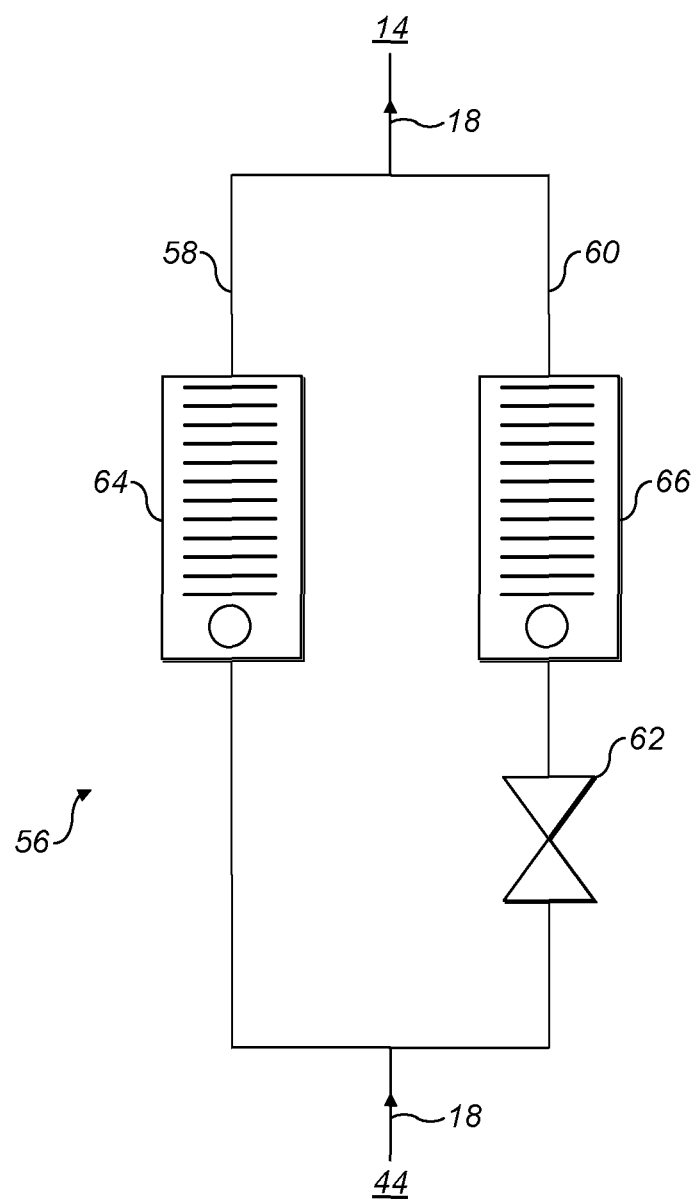
FIG. 3 shows a flow regulator for regulating the flow rate.

In an alternative arrangement shown in FIG. 3, a simplified flow regulator 56 is shown which comprises a plurality of gas conduits 58, 60 arranged to allow different flow rates of source gas 18 therethrough. A flow switch 62 directs the source gas to flow through one or more selected gas conduits for regulating the flow rate to the torch. For example, the gas conduit 58 is configured to allow a first flow rate of gas therethrough. The gas conduit 60 is configured to allow a second flow rate of gas therethrough which is different from the first flow rate. As shown in FIG. 2, the first flow rate is F1 and may for example be 10 slm. The second flow rate is F2 and may for example be 20 slm. The flow switch 62 is connected for operation by the power control 26 and the control is configured to control which of the selected one or more gas conduits source gas is conveyed dependent on the power regime required for operation of the plasma torch. A rotameter may be used to control flow.

The gas conduits may be sized to permit gas flow therethrough at the required rates or alternatively may be provided with flow controllers 64, 66, as shown, which are configured to allow a fixed flow rate through the conduits. Such fixed flow controllers are less expensive than the variable mass flow controller as described above.

Whilst two gas conduits 58, 60 are shown in FIG. 3, more than two gas conduits may be provided and used individually or in combination to provide a selected flow rate as controlled by the power control 26.

Figure 4:
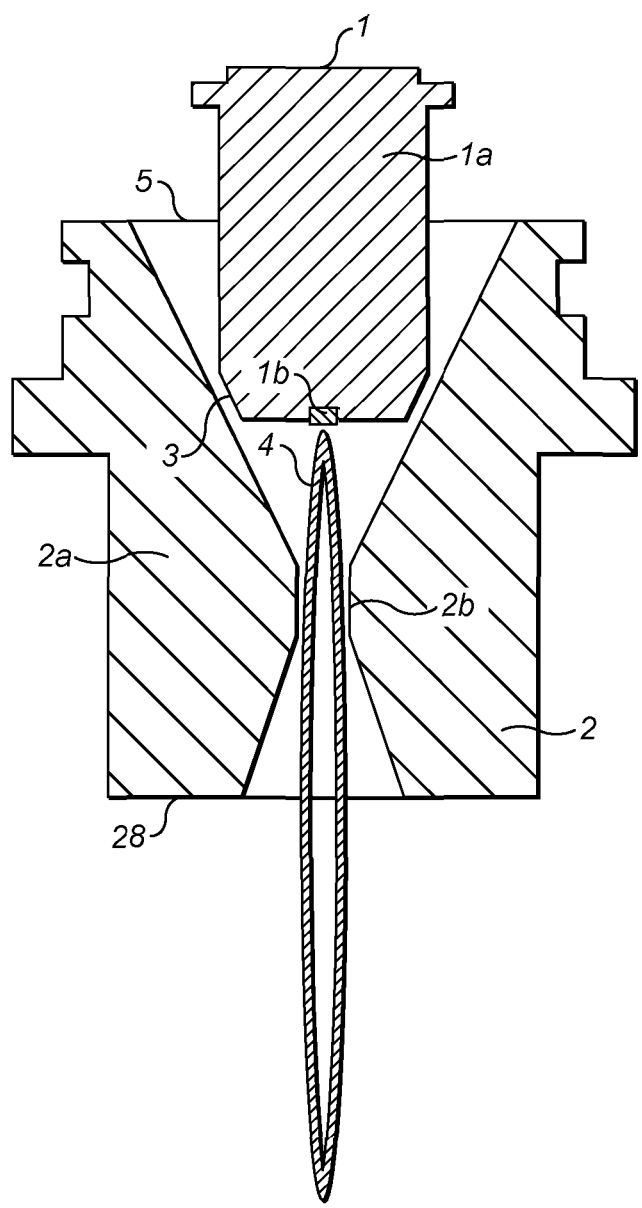
FIG. 4 shows a more detailed view of a plasma generator.

The plasma generator 14 may in one example be formed by the DC plasma torch shown in FIG. 4. The torch comprises a cathode arrangement 1 and an anode arrangement 2. The cathode arrangement comprises a substantially cylindrical body 1*a* and a button-type cathode 1*b*. The cooled (for example water-cooled) cathode body 1*a* is formed of a conducting metal with a higher thermal conductivity and work function than that of the thermionic material of the button cathode 1*b*, for example it is common to use a copper cathode body and a hafnium button cathode. The anode arrangement comprises a hollow body 2*a*, usually formed of copper, which further comprises an anode throat 2*b* and an inner frustro-conical surface portion 2*c* convergent towards, and terminating at, the throat 2*b*. When assembled the cathode arrangement 1 is located at least partially within and concentric to the copper anode 2. A gap must exist between the anode 2 and cathode 1 such that a conduit 3 is formed between the outer surface of the anode 2 and inner surface of the cathode assembly 1 through which source gas is conveyed for generating a plasma. The cathode 1 terminates within the conical portion 2*c* forming a plasma generating region 4 within said conical portion 2*c*.

The invention claimed is:

1. An apparatus for treating a gas stream, comprising:
   a DC plasma torch configured to generate a plasma flare from a source gas when energized by a source of electrical energy;
   a flow regulator configured to regulate the flow rate of the source gas supplied to the DC plasma torch to be energized;
   a current control configured to control an amount of current supplied to the DC plasma torch by the source of electrical energy; and
   a power control configured to control a power of the DC plasma torch by selecting a power regime from a first power regime and a second power regime through selective control of the flow regulator so that the flow rate of the source gas matches a constant flow rate associated with the selected power regime and selecting a level of power within the selected power regime through selective control of the current control while maintaining the constant flow rate associated with the selected power regime wherein the first power regime and the second power regime have respective ranges of power that can be achieved through selective control of the current control and wherein the lowest power of the range of power of the first power regime is greater than the highest power of the range of power of the second power regime.

2. The apparatus of claim 1, wherein the power of the DC plasma torch is switchable between the plurality of different power regimes by regulating the flow of source gas.

3. The apparatus of claim 2, wherein the DC plasma torch is configured to treat a plurality of gas streams which require different amounts of power for treatment, and wherein the plurality of different power regimes are selected to correspond with respective different amounts of required power.

4. The apparatus of claim 2, wherein the plasma torch is configured to operate in an idle mode for reducing the consumption of electrical energy, and wherein at least one of the plurality of different power regimes is selected to correspond with the power required to operate the plasma torch in the idle mode.

5. The apparatus of claim 2, wherein, the range of power of the second regime is less than half of the difference in power between the top of the range of power of the second regime and the bottom of the range of power of the first regime.

6. The apparatus of claim 1, wherein the flow regulator comprises a mass flow controller.

7. The apparatus of claim 1, wherein the flow regulator comprises a plurality of gas conduits arranged to allow different flow rates of source gas therethrough and a flow switch for directing the source gas to flow through selected one or more of the plurality of gas conduits for regulating the flow rate to the torch.

8. The apparatus of claim 2, wherein the flow regulator comprises a plurality of gas conduits arranged to allow different flow rates of source gas therethrough and a flow switch for directing the source gas to flow through selected one or more of the plurality of gas conduits for regulating the flow rate to the torch, wherein the flow switch is connected for operation by the power control, and wherein the power control is configured to control through which of the selected one or more gas conduits source gas is conveyed dependent on the power regime required for operation of the plasma torch.

9. A method comprising:
   generating, by a DC plasma torch, a plasma flare from a source gas energized by a source of electrical energy; and
   selectively controlling, by a power control, a flow regulator to control the flow rate of the source gas supplied to the DC plasma torch to select a power regime by matching the flow rate of the source gas to a constant flow rate of one of a first power regime and a second power regime, wherein each of the first and second power regimes has a respective range of power that can be achieved through selective control of a current control, and controlling the current control to control the amount of current supplied to the DC plasma torch by the source of electrical energy, and thereby set a power of the DC plasma torch to a power in the power range of the selected power regime, wherein a lowest power in the power range of the first power regime is greater than a highest power in the power range of the second power regime.

10. The method of claim 9, wherein the DC plasma torch is configured to treat a plurality of gas streams which require different amounts of power for treatment, and wherein the first and second power regimes are selected to correspond with respective different amounts of required power.

11. The method of claim 9, wherein the plasma torch is configured to operate in an idle mode for reducing the consumption of electrical energy, and wherein at least one of the first and second power regimes corresponds with the power required to operate the plasma torch in the idle mode.

12. The method of claim 9, wherein the flow regulator comprises a mass flow controller.

13. The method of claim 9, wherein the flow regulator comprises a plurality of gas conduits arranged to allow different flow rates of source gas therethrough and a flow switch for directing the source gas to flow through selected one or more of the plurality of gas conduits for regulating the flow rate to the torch.

* * * * *